United States Patent
Kempf

(10) Patent No.: US 11,163,759 B2
(45) Date of Patent: Nov. 2, 2021

(54) PREDICTING ENTITIES FOR DATABASE QUERY RESULTS

(71) Applicant: salesforce.com, inc., San Francisco, CA (US)

(72) Inventor: Guillaume Kempf, Grenoble (FR)

(73) Assignee: salesforce.com, inc., San Francisco, CA (US)

( * ) Notice: Subject to any disclaimer, the term of this patent is extended or adjusted under 35 U.S.C. 154(b) by 257 days.

(21) Appl. No.: 15/851,161

(22) Filed: Dec. 21, 2017

(65) Prior Publication Data
US 2019/0197152 A1    Jun. 27, 2019

(51) Int. Cl.
G06F 16/30     (2019.01)
G06F 16/242    (2019.01)
G06F 16/2457   (2019.01)
G06F 16/2455   (2019.01)

(52) U.S. Cl.
CPC .... G06F 16/2425 (2019.01); G06F 16/24578 (2019.01); *G06F 16/2455* (2019.01)

(58) Field of Classification Search
CPC ............ G06F 16/2425; G06F 16/2455; G06F 16/24578
USPC .......................................................... 707/769
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

U.S. Appl. No. 13/986,251, filed Apr. 16, 2013.

*Primary Examiner* — Kuen S Lu
(74) *Attorney, Agent, or Firm* — Dergosits & Noah LLP; Todd A. Noah

(57) ABSTRACT

Predicting entities for database query results are described. A system receives a query that includes a query term. The system outputs a query result that identifies at least one record that includes the query term. The system identifies a selection of a record that is identified by the query result and that includes the query term. The system stores information that associates the query term with an entity that corresponds to the selected record. The system scales the information that associates the query term with the entity. The system receives another query that includes the query term. The system outputs another query result in response to the other query, the other query result being based on the scaled information that associates the query term with the entity.

20 Claims, 5 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,244,723 B2 * | 8/2012 | Dean .................... G06F 16/951 707/723 |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,303,684 B1 * | 5/2019 | Kurihara ............ G06F 16/2453 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0129533 A1 * | 6/2006 | Purvis ................ G06F 16/9535 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0254527 A1 * | 10/2009 | Jung .................. G06F 16/3332 |
| 2009/0282010 A1 * | 11/2009 | Vasudevan ............ G06F 16/367 |
| 2012/0066216 A1 * | 3/2012 | Alexander .......... G06F 16/9566 707/723 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2014/0359537 A1 | 12/2014 | Jakobson et al. |
| 2015/0007050 A1 | 1/2015 | Jakobson et al. |
| 2015/0095162 A1 | 4/2015 | Jakobson et al. |
| 2015/0172563 A1 | 6/2015 | Jakobson et al. |
| 2019/0095241 A1 * | 3/2019 | Ago .................. G06F 16/24573 |
| 2019/0103172 A1 * | 4/2019 | Li .......................... G16H 70/40 |
| 2019/0156212 A1 * | 5/2019 | Bottaro ................. G06N 5/022 |

* cited by examiner

FIG. 2A

| Entity | Account | Contact | Lead |
|---|---|---|---|
| | | | |
| | Salesforce 97 | Johnson 103 | Chris 109 |
| | Services 67 | Chris 73 | James 83 |
| | Center 41 | James 47 | Johnson 59 |
| | University 17 | Scott 23 | Smith 31 |
| | Johnson 2 | Smith 5 | Terry 11 |
| | | | |
| Total | 224 | 251 | 293 |

| Entity | Account | Contact | Lead |
|---|---|---|---|
| | | | |
| | Salesforce 0.43 | Johnson 0.41 | Chris 0.37 |
| | Services 0.30 | Chris 0.29 | James 0.28 |
| | Center 0.18 | James 0.19 | Johnson 0.20 |
| | University 0.08 | Scott 0.09 | Smith 0.11 |
| | Johnson 0.01 | Smith 0.02 | Terry 0.04 |
| | | | |
| Total | 1.00 | 1.00 | 1.00 |

| Entity | Account | Contact | Lead |
|---|---|---|---|
| | | | |
| | Salesforce 1.00 | Johnson 0.66 | Chris 0.56 |
| | Services 1.00 | Chris 0.44 | James 0.60 |
| | Center 1.00 | James 0.40 | Johnson 0.32 |
| | University 1.00 | Scott 1.00 | Smith 0.85 |
| | Johnson 0.02 | Smith 0.15 | Terry 1.00 |

| Entity | Term | Center | Chris | James | Johnson | Salesforce | Scott | Services | Smith | Terry | University | Total |
|---|---|---|---|---|---|---|---|---|---|---|---|---|
| Account | | 41 | 73 | 47 | 2 | 97 | 23 | 67 | 5 | | 17 | 224 |
| Contact | | | 109 | 83 | 103 | | | | 31 | 11 | | 251 |
| Lead | | | | | 59 | | | | | | | 293 |
| Total | | 41 | 182 | 130 | 164 | 97 | 23 | 67 | 36 | 11 | 17 | 768 |

| Entity | Term | Center | Chris | James | Johnson | Salesforce | Scott | Services | Smith | Terry | University |
|---|---|---|---|---|---|---|---|---|---|---|---|
| Account | | 1.00 | 0.40 | 0.36 | 0.01 | 1.00 | 1.00 | 1.00 | 0.14 | | 1.00 |
| Contact | | | 0.60 | 0.64 | 0.63 | | | | 0.86 | 1.00 | |
| Lead | | | | | 0.36 | | | | | | |
| Total | | 1.00 | 1.00 | 1.00 | 1.00 | 1.00 | 1.00 | 1.00 | 36 | 1.00 | 1.00 |

302

PREDICTING ENTITIES FOR DATABASE QUERY RESULTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database system can store information in digital objects, such as a database that stores electronic records for business accounts, the accounts' contacts, and business leads in a customer relationship management (CRM) database. A digital object is an electronic form that can store information, such as a contact's given name, family name, job title, employer name, street address, city, state, zip code, e-mail address, and telephone number. A database system can respond to a user's query for data by predicting for which entity (such as an account, a contact, a lead, an opportunity, a group, a knowledge article, etc.) the user intends to search, and then outputting a query result based on the predictions. For example, when a user submits a query that includes the term "Johnson," a database system can use search indexes that identify the term "Johnson" in 1 of 100 account records, 5 of 1,000 contact records, and 12 of 2,000 lead records. The database system can output the 1 account record that includes the term "Johnson" as the first listed result because 1.0% of account records include the term "Johnson," output the 12 lead records that include the term "Johnson" as the next listed results because 0.6% of lead records include the term "Johnson," and output the 5 contact records that include the term "Johnson" as the last listed results because 0.5% of contact records include the term "Johnson."

BRIEF SUMMARY

A database system's search index data may not be an accurate basis to predict for which entity a user intends to search when the user submits a query. Furthermore, a database system may require a relatively large amount of time and system resources to request and then receive search index data from search servers.

In accordance with embodiments, there are provided systems and methods for predicting entities for database query results. A system receives a query that includes a query term. The system outputs a query result that identifies at least one record which includes the query term. The system identifies a selection of a record that is identified by the query result and that includes the query term. The system stores information that associates the query term with an entity that corresponds to the selected record. The system scales the information that associates the query term with the entity. The system receives another query that includes the query term. The system outputs another query result in response to the other query, and the other query result is based on the scaled information that associates the query term with the entity.

For example, a database system receives a user's query that includes the query term "Johnson." The database system outputs a query result that lists, in order, 1 account record that includes the term "Johnson," 12 lead records that include the term "Johnson," and then 5 contact records that include the term "Johnson." The database system identifies that the user selects the "Chris Johnson" contact record from the many records in the query result. The database system increments the count for the term "Johnson" for the contact entity in a log because the user selected a contact record. The database system normalizes data for the account entity, the contact entity, and the lead entity from the log. The database system receives another user's query that includes the term "Johnson." The database system outputs a query result that lists, in order, 5 contact records that include the term "Johnson," 1 account record that includes the term "Johnson," and then 12 lead records that include the term "Johnson." Rather than being limited to only using search index data that indicates how frequently a database term is included in each database entity, the database system uses previous users' selections of entities' records to predict for which entities subsequent users intend to search.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIGS. 2A-C depict example data structures for predicting entities for database query results, in an embodiment;

FIGS. 3A-B depict example data structures for predicting entities for database query results, in an embodiment;

DETAILED DESCRIPTION

General Overview

Systems and methods are provided for predicting entities for database query results. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods, data structures, and systems for predicting entities for database query results will be described with reference to example embodiments. The following detailed description will first describe an example method for predicting entities for database query results. Next, example data structures for predicting entities for database query results are depicted. Then a system for predicting entities for database query results is described.

While one or more implementations and techniques are described with reference to an embodiment in which predicting entities for database query results are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Figure 1:
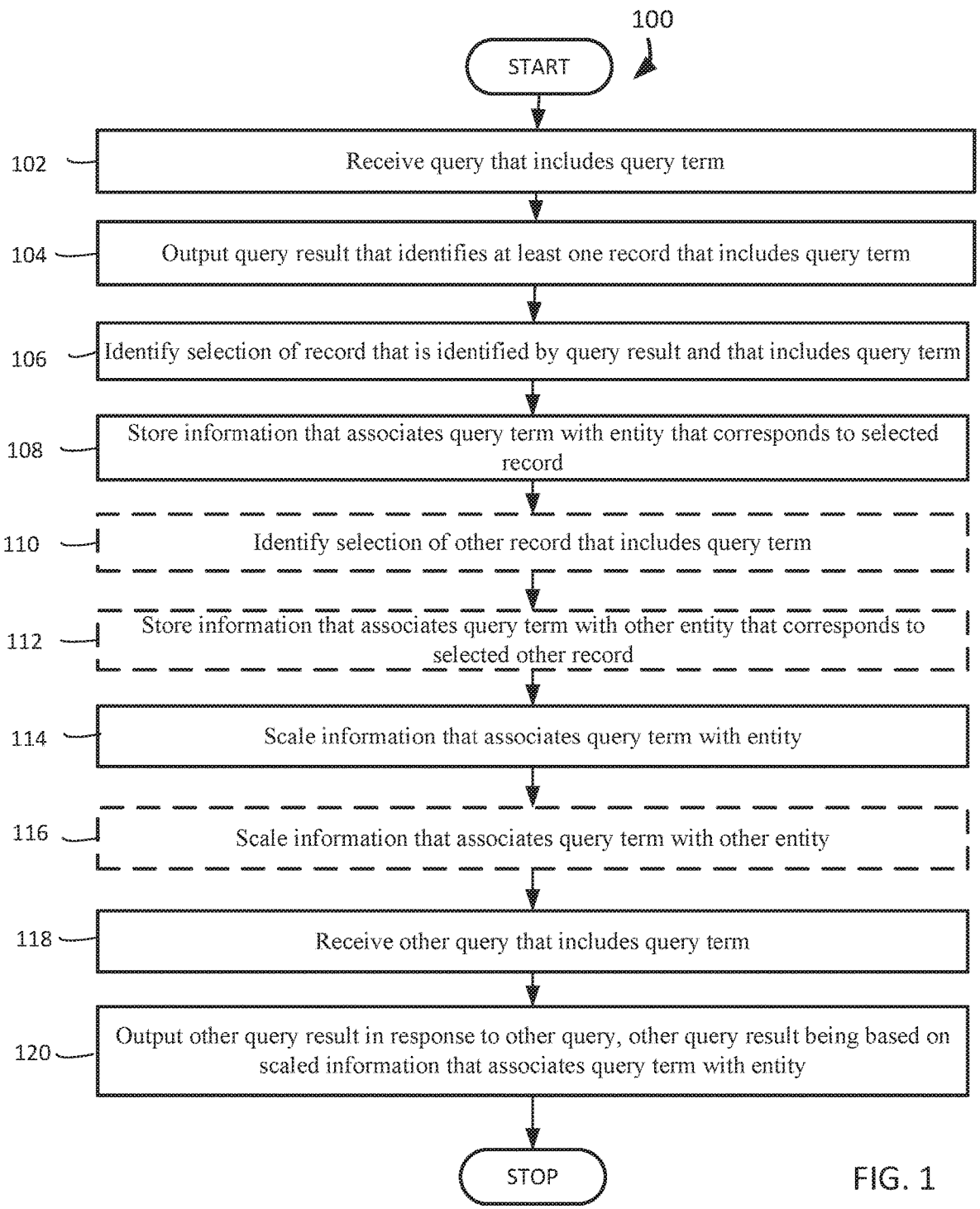
FIG. 1 is an operational flow diagram illustrating a high-level overview of a method for predicting entities for database query results, in an embodiment.

FIG. 1 is an operational flow diagram illustrating a high-level overview of a method 100 for predicting entities for database query results. As shown in FIG. 1, a database system predicts which entities a user's query intends, and then uses this prediction to generate a query result.

A query that includes a query term is received, block 102. The system uses previous users' queries to predict which entities are intended by subsequent users' queries. For example, and without limitation, this can include the database system receiving a user's query that includes the query term "Johnson." Although this example describes a query that includes only one query term, "Johnson," a query may include any number of query terms, such as "Does Chris Johnson work at Salesforce?" A query can be a request for data from a database. A query term can be a word or phrase used to describe a thing or to express a concept that is in a request for data from a database.

After receiving a query that includes a query term, a query result that identifies at least one record which includes the query term is output, block 104. The system uses previous users' query results to predict which entities are intended by subsequent users' queries. By way of example and without limitation, this can include the database system outputting a query result that lists, in order, 1 account record that includes the term "Johnson," 12 lead records that include the term "Johnson", and then 5 contact records that include the term "Johnson." During the time when the database system may be training on the users' selections of records, the database system may use typical search index data as the basis for the order of the records in query results. A query result can be data provided in response to a request for data from a database. A record can be a number of related items of information that are handled as a unit.

Having output a query result that includes a query term, a selection of a record that is identified by the query result and that includes the query term is identified, block 106. The system uses previous users' selections of query result records that correspond to entities as the basis for predicting which entities are intended by subsequent users' queries. In embodiments, this can include the database system identifying that the user selects the "Chris Johnson" contact record from the many records in the query result. A selection can be a choice of data for a particular computer operation. The database system responds to the selection of a record by outputting data stored in the selected record, such as by displaying Chris Johnson's email address.

Following the selection of a record that includes a query term, information that associates the query term with an entity that corresponds to the selected record is stored, block 108. The system counts previous users' selections of entities' records to predict which entities are intended by subsequent users' queries. For example, and without limitation, this can include the database system incrementing the count for the term "Johnson" from 102 to 103 for the contact entity in a log because the user selected Chris Johnson's contact record. An example entity log is depicted in FIG. 2A and described below in reference to FIG. 2A. Although this example describes incrementing a count for one term "Johnson" for an entity in a log because a user selected a record that corresponds to the entity, the database system may increment counts for multiple terms for an entity in a log because a user selected a record that corresponds to the entity. For example, the database system increments the count for the terms "Chris," "Johnson," and "Salesforce" for the contact entity in a log because the user selected Chris Johnson's contact record from the many records in the query result generated in response to the query "Does Chris Johnson work at Salesforce?" Information can be data that is processed, stored, or transmitted by a computer. An entity can be a data structure that stores a specific type of data. A selected record can be a number of related items of information that are handled as a unit and chosen for a particular computer operation.

After outputting a query result that includes a query term, a selection of another record that includes the query term is optionally identified, block 110. The system uses previous users' selections of entities' records to predict which entities are intended by subsequent users' queries. By way of example and without limitation, this can include the database system identifying that the user selects the "Terry Johnson" lead record from the many records in the query result. The other record may be selected from records in the same query result from which a record has already been selected, or selected from records in a different query result from which no record has been selected yet. For example, the user who selects the "Terry Johnson" lead record from the records in the query result is the same user who previously selected the "Chris Johnson" contact record from the records in the same query result, because a user may select multiple records from the records in the same query result. In an alternative example, the user who selects the "Terry Johnson" lead record from the query result is the same user who previously selected the "Chris Johnson" contact record from a different same query result. In yet another alternative example, the user who selects the "Terry Johnson" lead record from the records in the query result differs from another user who previously selected the "Chris Johnson" contact record from the records in a different query result. The database system can respond to any user selection of a record from the records in a query result by outputting data for the selected record, such as by displaying Terry Johnson's phone number.

Following the selection of another record that includes a query term, information that associates the query term with another entity that corresponds to the selected other record is optionally stored, block 112. The system counts previous users' selections of entities' records to predict which entities are intended by subsequent users' queries. In embodiments, this can include the database system incrementing the count for the term "Johnson" from 58 to 59 for the lead entity in a log because the user selected Terry Johnson's lead record. An example entity log is depicted in FIG. 2A and described below in reference to FIG. 2A.

After storing information that associates a query term with an entity, the information that associates the query term with the entity is scaled, block 114. The system normalizes previous users' selections of entities' records to predict which entities are intended by subsequent users' queries. For example, and without limitation, this can include the database system normalizing data from the entity log, which include the count of the user selecting Chris Johnson's contact record, as well as the counts for the account entity and the lead entity. Scaling can be representing in proportional dimensions, by reducing or increasing in size, according to a common standard.

Scaling the information that associates the query term with the entity may include determining a term-entity ratio by dividing a total number of user-selected records that correspond to the entity and that include the query term by a total number of user-selected records that correspond to the entity; and determining a scaled term-entity ratio by dividing the term-entity ratio by a sum of multiple term-entity ratios that correspond to multiple entities. For example, the database system divides 103 (the total number of instances when users selected any contact entity in response to any query that included the term "Johnson") by 251 (the total number of instances when users selected any contact entity in response to any query) to result in the Johnson-contact ratio of 0.41 (103 divided by 251), as depicted by the example data structures in FIGS. 2A and B, logs 200 and 202. Then the database system divides the Johnson-contact ratio of 0.41 by 0.62 (the sum of the Johnson-contact ratio of 0.41, the Johnson-lead ratio of 0.20, and the Johnson-account ratio of 0.01) to result in the scaled Johnson-contact ratio of 0.66, as depicted by the example data structures in FIGS. 2B and C, logs 202 and 204.

A term-entity ratio can be the quantitative relation between an amount representing a word or phrase in a data request and an amount representing a data structure that stores a specific type of data. A total number can be an arithmetical value that represents an entire amount. A user-selected record can be a number of related items of information that are handled as a unit and chosen by a person operating a computer for a particular computer operation. A scaled term-entity ratio can be the quantitative relation between an amount representing a word or phrase in a data request and an amount representing a data structure that stores a specific type of data, which is represented in proportional dimensions according to a common standard. A sum can be the total amount resulting from the addition of two or more numbers, amounts, or items.

After storing information that associates a query term with another entity, the information that associates the query term with the other entity is optionally scaled, block 116. The system normalizes previous users' selections of entities' records to predict which entities are intended by subsequent users' queries. By way of example and without limitation, this can include the database system normalizing data from the entity log, which include the count of the user selecting Terry Johnson's lead record, as well as the counts for the account entity and the contact entity. For this example, the database system can divide 59 (the total number of instances when users selected any lead entity in response to any query that included the term "Johnson") by 293 (the total number of instances when users selected any lead entity in response to any query) to result in the Johnson-lead ratio of 0.20 (59 divided by 293), as depicted by the example data structures in FIGS. 2A and B, logs 200 and 202. Then the database system divides the Johnson-lead ratio of 0.20 by 0.62 (the sum of the Johnson-contact ratio of 0.41, the Johnson-lead ratio of 0.20, and the Johnson-account ratio of 0.01) to result in the scaled Johnson-lead ratio of 0.32, as depicted by the example data structures in FIGS. 2B and C, logs 202 and 204.

Having output a query result in response to a query that includes a query term, another query that includes the query term is received, block 118. The system predicts which entities are intended by subsequent users' queries based on previous users' selections of entities' records. In embodiments, this can include the database system receiving another user's query that includes the term "Johnson" after the selection-based training has been completed. The selection-based training may be completed in its entirety before predicting any entities based on users' selections of entities' records, or the selection-based training may be an ongoing process that continually refines the accuracy of such predictions. Although this example describes the other query as being received from another user, the other query may be received from the same user who submitted the original query.

After outputting a query result in response to a query that includes a query term, and scaling information that associates the query term with an entity, another query result is output in response to the other query, the other query result being based on scaled information that associates the query term with the entity, block 120. The system uses previous users' selections of entities' records to predict which entities are intended by subsequent users' queries, and to generate query results based on the predictions. For example, and without limitation, this can include the database system outputting a query result based on the normalized Johnson-entity ratios that indicate a 66% probability that the user intends to select a contact entity, a 32% probability that the user intends to select a lead entity, and a 2% probability that the user intends to select an account entity. Therefore, the query result lists, in order, 5 contact records that include the term "Johnson," 12 lead records that include the term "Johnson," and then the 1 account record that includes the term "Johnson." Although this example describes the query result listing records based only on the normalized term-entity ratios, with all of the lead records listed after all of the contact records and listed before the account record, the record list order may be based on additional factors, such that records for one type of entity may be interspersed with records for another type of entity. Scaled information can be data that is processed, stored, or transmitted by a computer, and which is represented in proportional dimensions according to a common standard.

The other query result may be further based on the scaled information that associates the query term with the other entity. For example, the database system outputs a query result that lists, in order, 5 contact records that include the term "Johnson," 12 lead records that include the term "Johnson," and then the 1 account record that includes the term "Johnson," listing the lead records before the account record partially based on the normalized information that reflects the previous user's selection of Terry Johnson's lead record.

The other query result may be further based on a ratio of a total number of database records that correspond to the entity and that include the query term to a total number of database records that correspond to the entity. For example, the database system generates the query result based half on the normalized information that reflects the previous user selections of contact, lead, and account records, and based half on the search indexes that indicate 1.0% of account records include the term "Johnson," 0.6% of lead records include the term "Johnson," and 0.5% of contact records include the term "Johnson." In this example, the normalized term-entity ratios indicate a 66% probability that the user intends to select a contact entity, a 32% probability that the user intends to select a lead entity, and a 2% probability that the user intends to select an account entity.

In contrast, the term-entity ratios based on the search indexes include an indexed Johnson-account ratio of 0.48 (1.0% for account records divided by 2.1%, which is the sum of 1.0% for account records plus 0.6% for lead records plus 0.5% for contact records), an indexed Johnson-lead ratio of 0.28 (0.6% for lead records divided by 2.1%), and an indexed Johnson-contact ratio of 0.24 (0.5% for contact records divided by 2.1%). Combining 50% of the normalized term-entity ratios with 50% of the indexed term-entity ratios results in a hybrid Johnson-contact ratio of 0.45 (50% of the normalized Johnson-contact ratio of 0.66 and 50% of the indexed Johnson-contact ratio of 0.24), a hybrid Johnson-lead ratio of 0.30 (50% of the normalized Johnson-lead ratio of 0.32 and 50% of the indexed Johnson-lead ratio of 0.28), and a hybrid Johnson-account ratio of 0.25 (50% of the normalized Johnson-account ratio of 0.02 and 50% of the indexed Johnson-account ratio of 0.48). The database system can respond to a query that includes the term "Johnson" by outputting a query result based on the hybrid term-entity ratios that indicate a 45% probability that the user intends to select a contact entity, a 30% probability that the user intends to select a lead entity, and a 20% probability that the user intends to select an account entity. Although this example describes the database basing the query result half on the normalized information from user selections and based half on search index data, the database system may base the query result on any combination of search index data and the normalized information from user selections. A database record can be a structured set of related items of information that are handled as a unit by a computer. A ratio can be the quantitative relation between two amounts.

Rather than being limited to only using search indexes that indicate how frequently a database term is included in each database entity, the database system uses previous users' selections of entities' records to predict for which entities subsequent users intend to search. The normalized information that reflects previous users' selections of entities' records may be referred to as a data dictionary, a term dictionary, or a term-entity dictionary.

Generating specific term dictionaries reflecting the data of every tenant, each of which may be referred to as an organization, in a multi-tenant database system may be a difficult task. There are compromises between specificity, as each term dictionary should reflect only one tenant's data, and security, as one tenant's data should not be available to another tenant. Another challenge for using term dictionaries is storage space, as some existing dictionaries, such as Dun & Bradstreet, consume too much memory to be hosted for every tenant, such as 2 gigabytes (GB), and would come with some licensing issues for each tenant to use their copy of an existing term dictionary. However, having a term dictionary for every tenant for each of the tenant's entities (CRM object such as account, contact, lead, etc.) provides valuable information for a database system to understand a user's query and predict which entities the user intended. The term dictionary of the present disclosure may require a relatively small amount of storage space, such as 1 megabyte (MB), thereby addressing the storage space challenge for multiple tenants in a multi-tenant database. A database system may access 10,000 entries per entity in a relatively short amount of time, in contrast to the relatively long amount of time required to request and then receive the data from search indexes hosted by search servers.

The method 100 may be repeated as desired. Although this disclosure describes the blocks 102-120 executing in a particular order, the blocks 102-120 may be executed in a different order. In other implementations, each of the blocks 102-120 may also be executed in combination with other blocks and/or some blocks may be divided into a different set of blocks.

FIGS. 2A, 2B and 2C depict example data structures 200, 202 and 204 for predicting entities for database query results, in an embodiment. FIG. 2A depicts that the database system incremented the count for the term "Johnson" from 102 to 103 for the contact entity in the log 200 because the user selected Chris Johnson's contact record, incremented the count for the term "Johnson" from 58 to 59 for the lead entity in the log 200 because the user selected Terry Johnson's lead record, and incremented the count for the term "Johnson" from 1 to 2 for the account entity in the log 200 when a user selected the Johnson & Johnson account record. Although FIG. 2A depicts the log 200 as storing 5 rows of term entries for each of 3 entity columns, the log 200 may store any number of entries for any number of entities, such as 10,000 entries for 10 entities.

FIGS. 2A and 2B depict that the database system divides 103 (the total number of instances when users selected any contact entity in response to any query that included the term "Johnson") by 251 (the total number of instances when users selected any contact entity in response to any query) to result in the Johnson-contact ratio of 0.41 in log 202 (103 divided by 251 in log 200). FIGS. 2B and 2C depict that the database system divides the Johnson-contact ratio of 0.41 by 0.62 in log 202 (the sum of the Johnson-contact ratio of 0.41, the Johnson-lead ratio of 0.20, and the Johnson-account ratio of 0.01) to result in the scaled Johnson-contact ratio of 0.66 in log 204.

FIGS. 2A and 2B depict that the database system divides 59 (the total number of instances when users selected any lead entity in response to any query that included the term "Johnson") by 293 (the total number of instances when users selected any lead entity in response to any query) to result in the Johnson-lead ratio of 0.20 in log 202 (59 divided by 293 in log 200). FIGS. 2B and C depict that the database system divides the Johnson-lead ratio of 0.20 by 0.62 (the sum of the Johnson-contact ratio of 0.41, the Johnson-lead ratio of 0.20, and the Johnson-account ratio of 0.01) to result in the scaled Johnson-lead ratio of 0.32 in log 204.

FIGS. 2A and 2B depict that the database system divides 2 (the total number of instances when users selected any account entity in response to any query that included the term "Johnson") by 224 (the total number of instances when users selected any account entity in response to any query) to result in the Johnson-account ratio of 0.01 in log 202 (2 divided by 224 in log 200). FIGS. 2B and 2C depict that the database system divides the Johnson-account ratio of 0.01 by 0.62 in log 202 (the sum of the Johnson-contact ratio of 0.41, the Johnson-lead ratio of 0.20, and the Johnson-account ratio of 0.01) to result in the scaled Johnson-account ratio of 0.02 in log 204.

FIGS. 3A and 3B depict example data structures for predicting entities for database query results, in an embodiment. The database system may use different methods and different data structures to store the information associating query terms with corresponding entities and to scale this information. FIG. 3A depicts that the database system incremented the count for the term "Johnson" from 102 to 103 for the contact entity in the log 300 because the user selected Chris Johnson's contact record, incremented the count for the term "Johnson" from 58 to 59 for the lead entity in the log 300 because the user selected Terry Johnson's lead record, and incremented the count for the term "Johnson" from 1 to 2 for the account entity in the log 300 when a user selected the Johnson & Johnson account record.

FIGS. 3A and 3B depict that the database system divides 103 (the total number of instances when users selected any contact entity in response to any query that includes the term "Johnson") by 164 (the total number of instances when users selected any entity in response to any query that included the term "Johnson") to result in the alternatively normalized Johnson-contact ratio of 0.63 in log 302 (103 divided by 164 in log 300). Similarly, the database system divides 59 (the total number of instances when users selected any lead entity in response to any query that included the term "Johnson") by 164 (the total number of instances when users selected any entity in response to any query that included the term "Johnson") to result in the alternatively normalized Johnson-lead ratio of 0.36 in log 302 (59 divided by 164 in log 300). Likewise, the database system divides 2 (the total number of instances when users selected any account entity in response to any query that included the term "Johnson") by 164 (the total number of instances when users selected any entity in response to any query that included the term "Johnson") to result in the alternatively normalized Johnson-account ratio of 0.01 (2 divided by 164). In contrast to the previously normalized term-entity ratios, the alternatively normalized term-entity ratios are not normalized based on the number of time each type of entity is selected, thereby resulting in a less precise prediction of the intended entity for a user's query. However, since fewer computation are required to calculate the alternatively normalized term-entity ratios, the database system can use the alternatively normalized term-entity ratios if each entity has its records selected approximately the same number of times. The database system can respond to a query that includes the term "Johnson" by outputting a query result based on the alternatively normalized term-entity ratios that indicate a 63% probability that the user intends to select a contact entity, a 36% probability that the user intends to select a lead entity, and a 1% probability that the user intends to select an account entity.

System Overview

Figure 4:
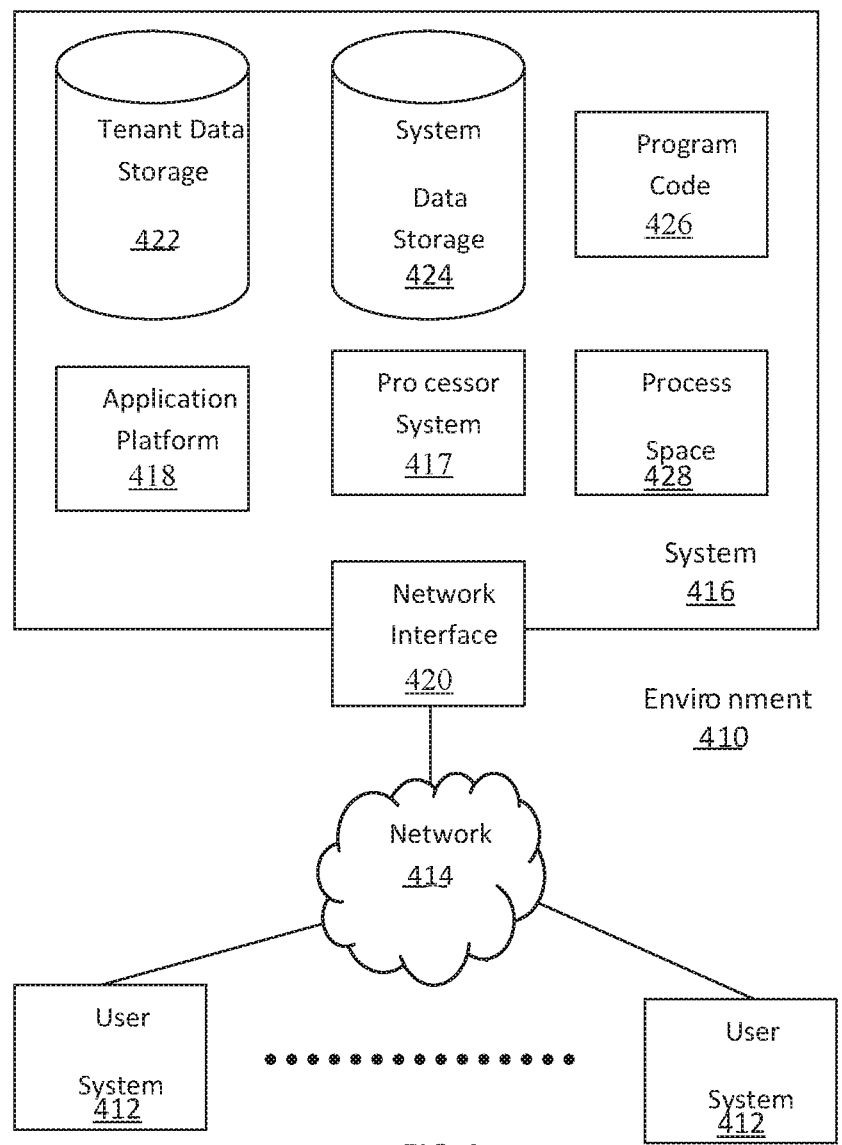
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a work station, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects. A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 416 implements applications other than, or in addition to, a CRM application. For example, the system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414. Each of the user systems 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/ in which may be used to program a computer to perform any of the processes of the embodiments described herein. Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data and media content to the user (client) systems 412 to support the access by the user systems 412 as tenants of the system 416.

As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
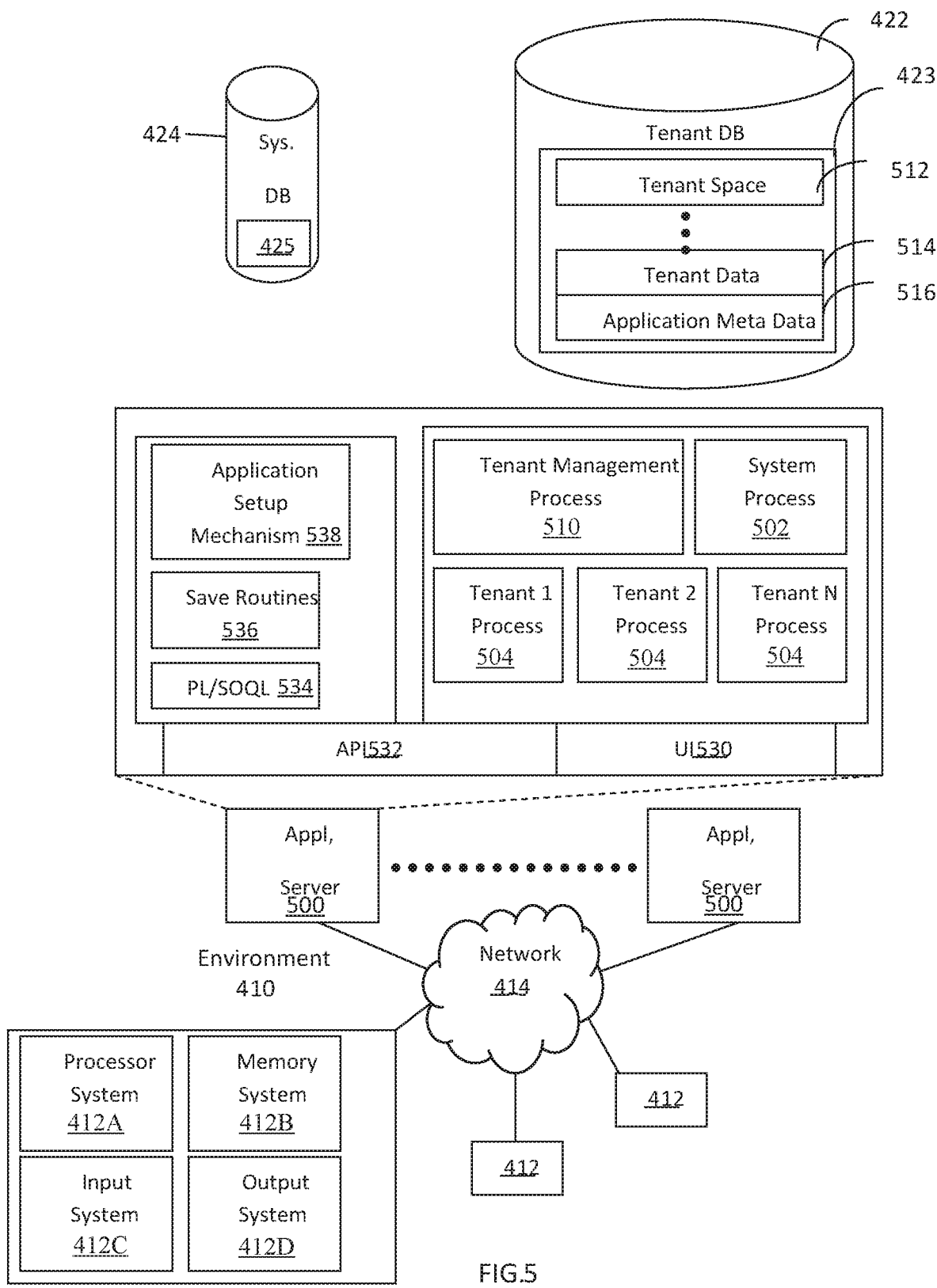
FIG. 5 illustrates a block diagram of an embodiment of elements of FIG. 4 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416. FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $500_1$-$500_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long term memory. The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424. Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user. For example, a copy of a user's most recently used (MRU) items might be stored to the user storage 514. Similarly, a copy of MRU items for an entire organization that is a tenant might be stored to the tenant storage area 512. The UI 530 provides a user interface and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also may be used. For example, in certain embodiments, three consecutive requests from the same user could hit three different application servers 500, and three requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system comprising:
one or more processors; and
a non-transitory computer readable medium storing a plurality of instructions, which when executed, cause the one or more processors to:
receive a query comprising a query term;
output a query result that identifies at least one record comprising the query term;
identify a selection of a record identified by the query result and comprising the query term, the record being one of a plurality of records of a database;
store information that associates the query term with a database entity that includes the selected record, each record of the database being associated with one of a plurality of different entities of the database, the storing comprising adjusting a count for the database entity of the selected record, the count comprising a number of times records associated with the database entity were selected from past query results;
scale the information that associates the query term with the entity, the scaling being based on information for all entities that include records associated with the query term;
receive another query comprising the query term; and
output another query result in response to the other query, the other query result being based on the scaled information that associates the query term with the entity.

2. The system of claim 1, wherein scaling the information that associates the query term with the entity comprises:
determining a term-entity ratio by dividing a total number of user-selected records that correspond to the entity and that comprise the query term by a total number of user-selected records that correspond to the entity; and
determining a scaled term-entity ratio by dividing the term-entity ratio by a sum of a plurality of term-entity ratios that correspond to a plurality of entities.

3. The system of claim 1, wherein the other query result is further based on a ratio of a total number of database records that correspond to the entity and that include the query term to a total number of database records that correspond to the entity.

4. The system of claim 1, comprising further instructions, which when executed, cause the one or more processors to:
identify a selection of another record; and
store information that associates the query term with another entity that corresponds to the selected other record.

5. The system of claim 4, comprising further instructions, which when executed, cause the one or more processors to scale the information that associates the query term with the other entity.

6. The system of claim 5, wherein the other query result is further based on the scaled information that associates the query term with the other entity.

7. The system of claim 1, wherein storing the information comprises storing the information for a tenant in a multi-tenant database.

8. A computer program product comprising a non-transitory computer-readable medium having computer readable program code embodied therein to be executed by one or more processors, the program code including instructions to:
receive a query comprising a query term;
output a query result that identifies at least one record comprising the query term;
identify a selection of a record identified by the query result and comprising the query term, the record being one of a plurality of records of a database;
store information that associates the query term with a database entity that includes the selected record, each record of the database being associated with one of a plurality of different entities of the database, the storing comprising adjusting a count for the database entity of the selected record, the count comprising a number of times records associated with the database entity were selected from past query results;
scale the information that associates the query term with the entity, the scaling being based on information for all entities that include records associated with the query term;
receive another query comprising the query term; and
output another query result in response to the other query, the other query result being based on the scaled information that associates the query term with the entity.

9. The computer program product of claim 8, wherein scaling the information that associates the query term with the entity comprises:
determining a term-entity ratio by dividing a total number of user-selected records that correspond to the entity and that comprise the query term by a total number of user-selected records that correspond to the entity; and
determining a scaled term-entity ratio by dividing the term-entity ratio by a sum of a plurality of term-entity ratios that correspond to a plurality of entities.

10. The computer program product of claim 8, wherein the other query result is further based on a ratio of a total number of database records that correspond to the entity and that include the query term to a total number of database records that correspond to the entity.

11. The computer program product of claim 8, wherein the program code comprises further instructions to:

identify a selection of another record; and
store information that associates the query term with another entity that corresponds to the selected other record.

12. The computer program product of claim 11, wherein the program code comprises further instructions to scale the information that associates the query term with the other entity.

13. The computer program product of claim 12, wherein the other query result is further based on the scaled information that associates the query term with the other entity.

14. The computer program product of claim 8, wherein storing the information comprises storing the information for a tenant in a multi-tenant database.

15. A method comprising:
receiving a query comprising a query term;
outputting a query result that identifies at least one record comprising the query term;
identifying a selection of a record identified by the query result and comprising the query term, the record being one of a plurality of records of a database;
storing information that associates the query term with a database entity that includes the selected record, each record of the database being associated with one of a plurality of different entities of the database, the storing comprising adjusting a count for the database entity of the selected record, the count comprising a number of times records associated with the database entity were selected from past query results;
scaling the information that associates the query term with the entity, the scaling being based on information for all entities that include records associated with the query term;
receiving another query comprising the query term; and
outputting another query result in response to the other query, the other query result being based on the scaled information that associates the query term with the entity.

16. The method of claim 15, wherein scaling the information that associates the query term with the entity comprises:
determining a term-entity ratio by dividing a total number of user-selected records that correspond to the entity and that comprise the query term by a total number of user-selected records that correspond to the entity; and
determining a scaled term-entity ratio by dividing the term-entity ratio by a sum of a plurality of term-entity ratios that correspond to a plurality of entities.

17. The method of claim 15, wherein the other query result is further based on a ratio of a total number of database records that correspond to the entity and that include the query term to a total number of database records that correspond to the entity.

18. The method of claim 15, the method further comprising:
identifying a selection of another record; and
storing information that associates the query term with another entity that corresponds to the selected other record.

19. The method of claim 18, the method further comprising scaling the information that associates the query term with the other entity.

20. The method of claim 19, wherein the other query result is further based on the scaled information that associates the query term with the other entity.

* * * * *